Oct. 4, 1949. P. HUBMANN 2,483,905
TURRET-TYPE DOMESTIC KITCHEN MACHINE
Filed Dec. 27, 1946 2 Sheets-Sheet 1

INVENTOR:
Paul Hubmann
by Sommers & Young
Attorneys

Oct. 4, 1949.　　　　　P. HUBMANN　　　　　2,483,905
TURRET-TYPE DOMESTIC KITCHEN MACHINE
Filed Dec. 27, 1946　　　　　　　　　　　　2 Sheets-Sheet 2

INVENTOR:
Paul Hubmann
by Sommers & Young
Attorneys

Patented Oct. 4, 1949

2,483,905

UNITED STATES PATENT OFFICE 2,483,905

TURRET-TYPE DOMESTIC KITCHEN MACHINE

Paul Hubmann, Zug, Switzerland

Application December 27, 1946, Serial No. 718,734
In Switzerland February 22, 1946

2 Claims. (Cl. 74—16)

Machines serving for mechanically operating kitchen appliances and auxiliary devices, are known in the art. Kitchen machines designed for driving a plurality of such appliances and devices are used only in restaurants, hospitals and the like.

The small-size household kitchen machines on the market today ordinarily comprise only one drive connection for alternatingly and alternatively operating the kitchen appliances and auxiliary devices. Mounting and demounting the latter is of decided disadvantage and inconvenience to the cook, since each one of them has to be fetched from and put back again to its place.

Such disadvantage and inconvenience is avoided by my present invention, the subject matter of which is a house-hold kitchen machine in combination with a plurality of kitchen appliances and auxiliary devices such as mixers, kneaders, beaters, vegetable and meat cutters and comminutors and the like, which devices are mounted on the machine whether in use or not. Such machine comprises an electric motor, a stationary drive gear, a rotatable stand whereon the said devices are mounted in circular arrangement, and a gear wheel for each of said devices, journaled in the said stand, the whole in such combination that upon turning the said stand, any one of the said devices may be put into operation.

Figure 1:
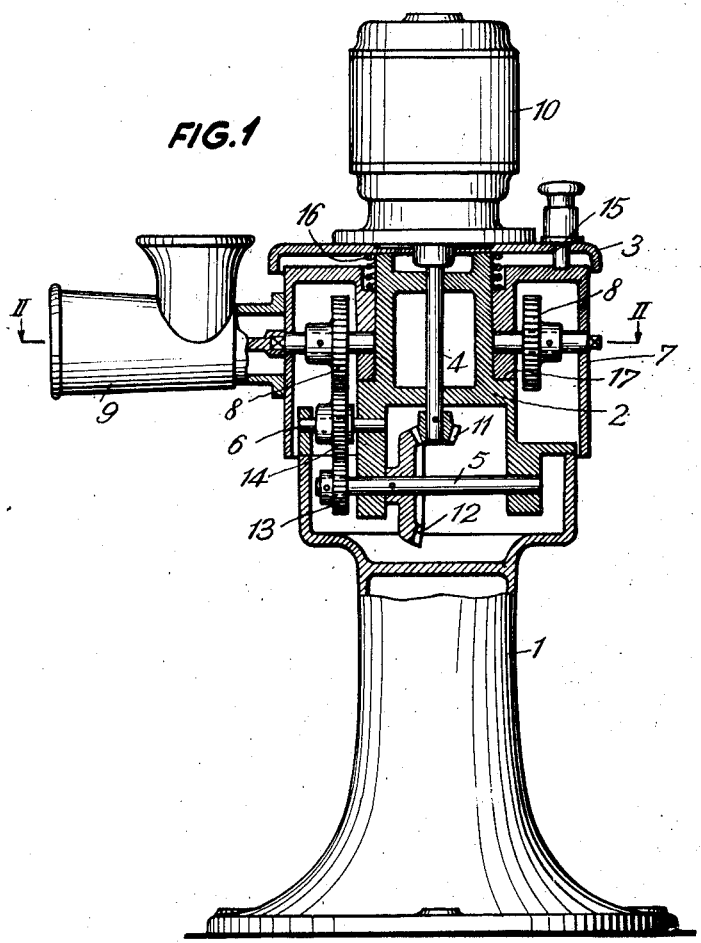
Figure 2:
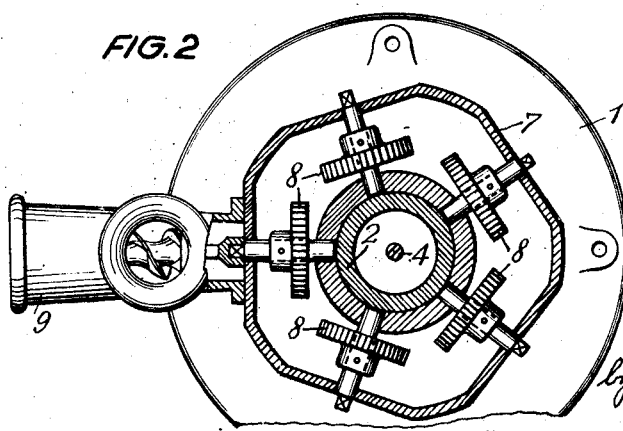
Figure 3:
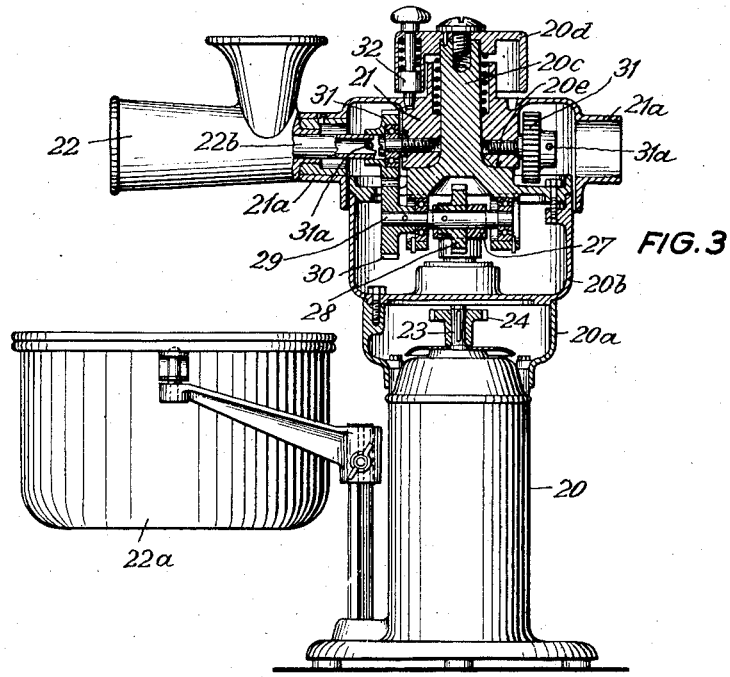
Figure 4:
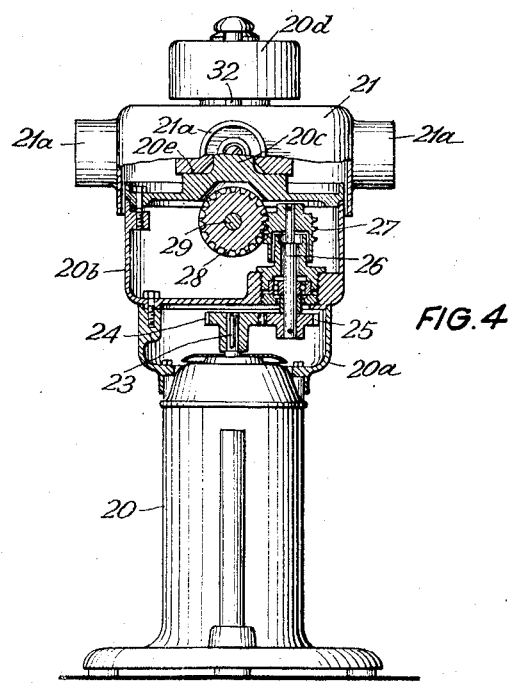

Two embodiments of my present invention are shown in the accompanying drawings, in which Fig. 1 is an elevation, partly in section of one form of the invention, Fig. 2 is a cross-section on line II—II of Fig. 1, and Figs. 3 and 4 are views, similar to Fig. 1, at right angles to each other, of a modification.

In the embodiment shown in Figs. 1 and 2, the electric motor is mounted on top, and in that shown in Figs. 3 and 4 in the pedestal of the machine.

In the first embodiment, a mount 2 is secured to the stationary pedestal or column 1, forming part thereof, and a motor-mounting cap 3 is secured thereto. A drive shaft 4, a jack shaft 5, and an intermediate-wheel shaft 6 are journaled in the mount 2. A stand or turret 7, on which a plurality of kitchen devices, e. g. five, are mounted is pivoted on mount 2. In the drawing only one of the said kitchen devices, i. e. a cutter and comminutor 9, is shown. The driving elements, comprising five spur gears 8, for the said devices 9 are journaled in the turret 7.

An electric motor 10 drives a pinion 13 keyed to jack shaft 5, by way of shaft 4 and the bevel gears 11 and 12. Pinion 13 meshes with the intermediate gear 14 keyed to intermediate shaft 6, and with one of the spur gears 8. The latter drive their appurtenant kitchen devices, but only one at a time. By turning turret 7, any one of the gears 8, i. e. any one of the devices 9, alternatively may be brought to mesh with gear 14.

Turret 7 is located by the click or detent 15 so as to bring about a proper engagement of the spur gears 14 and 8. To such end, a recess is provided on the top plate of turret 7 for each operative setting thereof, i. e. for each gear 8.

In order to prevent a jamming of gears 14 and 8 when rotating turret 7, the latter is axially displaceable on mount 2. When one of the gears 8 and the gear 14 mesh properly, a spring 16 brings turret 7 into abutment against the shoulder 17 of mount 2, and the spring-loaded detent 15 snaps into the corresponding recess on the top plate of turret 7, thus ensuring the proper interengagement of gears 14 and 8.

In the embodiment shown in Figs. 3 and 4, a pedestal or column 20, built up of portions 20a, 20b, 20c and 20d, is set up vertically on a table. A turret 21 is pivoted on portion 20c, bearing on the shoulder 20e thereof.

A plurality in this case four kitchen devices 22 are mounted on studs 21a of turret 21, only one of the said devices being shown in the drawing. A trough 22a cooperates with one or more of devices 22 for beating or stirring operations.

The electric motor (not shown) is housed in the foot portion of pedestal 20, and its shaft 23 drives a jack shaft 26 by way of the spur gears 24, 25. A worm 27, secured to jack shaft 26, meshes with a worm wheel 28 secured to an intermediate shaft 29. A spur gear 30 also is secured to the latter and meshes with a pinion 31 secured to turret 21. Four pinions 31 are provided for i. e. one for each kitchen device mounted. Each of the latter is provided with a hollow-shaft 22b which is adapted to be engaged by a pin 31a integral with pinion 31.

To ensure a proper interengagement of gear 30 and any one of the four pinions 31 of turret 21 and to maintain such interengagement during the operation of a device, a spring-loaded detent 32 is provided in the top portion 20d of column 20, which detent is adapted to snap into any of the four recesses 32a provided in the top face of turret 21.

In order to prevent pinions 31 from jamming with the gear 30 of the drive gear, turret 21 is axially displaceable, against the action of the spring 33, relative to cap 20d of column 20.

What I claim and desire to secure by Letters Patent is:

1. A turret type domestic kitchen-machine of the character described, comprising an electric-motor, a stationary pedestal column in which said motor is mounted, a gear system driven by said motor, a turret pivoted on said column, a spur-gear forming part of said gear system driven by said motor and rotatable about an axis at right angles to the turning axis of said turret, a plurality of independent pinions borne for rotation in said turret and adapted to be brought into mesh with said spur-gear, a plurality of individual kitchen devices secured to said turret and adapted to be operated by said motor-driven gear, one at a time, by way of one of said pinions, and means to permit an axial displacement of said turret against spring-action automatically caused by any of said pinions riding on said spur gear into engagement with the latter when said turret is turned.

2. In a turret type domestic kitchen-machine as set forth in claim 1, a plurality of positioning slots in one part of said machine and spring-actuated detent means carried by another part of said machine, one of said parts being fixed and the other movable, said detent cooperating with said slots to hold a selected one of said devices in operative relation to said spur gear.

PAUL HUBMANN.

REFERENCES CITED

The following references are of record in the file of this patent:

UNITED STATES PATENTS

| Number | Name | Date |
| --- | --- | --- |
| 504,289 | Vanderbeek et al. | Aug. 29, 1893 |
| 1,498,859 | Werkerle | June 24, 1924 |
| 1,861,937 | Philips | June 7, 1932 |
| 2,084,234 | Anderson et al. | June 15, 1937 |
| 2,093,692 | Daniels | Sept. 21, 1937 |